(12) United States Patent
Kato

(10) Patent No.: US 7,614,224 B2
(45) Date of Patent: Nov. 10, 2009

(54) HYDRAULIC SYSTEM FOR INDUSTRIAL VEHICLE

(75) Inventor: Norihiko Kato, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 267 days.

(21) Appl. No.: 11/835,177

(22) Filed: Aug. 7, 2007

(65) Prior Publication Data

US 2008/0041047 A1  Feb. 21, 2008

(30) Foreign Application Priority Data

Aug. 8, 2006 (JP) .............................. 2006-215846

(51) Int. Cl.
*F16D 31/02* (2006.01)

(52) U.S. Cl. .......................................... 60/414; 60/421

(58) Field of Classification Search .................. 60/414, 60/420, 421, 429, 430
See application file for complete search history.

(56) References Cited

U.S. PATENT DOCUMENTS 4,422,290 A * 12/1983 Huffman ...................... 60/430
4,633,666 A * 1/1987 Karakama .................... 60/421
4,635,439 A * 1/1987 Wible .......................... 60/421
7,278,503 B1 * 10/2007 Kato et al. ................ 180/65.22
7,464,778 B2 * 12/2008 Kato et al. ............. 180/65.245

FOREIGN PATENT DOCUMENTS

| JP | 59-40168 | 3/1984 |
|---|---|---|
| JP | 07-315792 | 12/1995 |
| JP | 2000-313600 | 11/2000 |
| JP | 2005-298163 | 10/2005 |
| JP | 2006131340 A | 5/2006 |
| JP | 2006136120 A | 5/2006 |
| KR | 19860002769 U | 3/1986 |

* cited by examiner

*Primary Examiner*—Michael Leslie
(74) *Attorney, Agent, or Firm*—Woodcock Washburn LLP

(57) ABSTRACT

A hydraulic circuit of a hybrid type industrial vehicle drivable by an engine and an electric motor is disclosed. A generator motor is driven by the engine and generates electricity. A cargo handling hydraulic pump is actuated in conjunction with an operation of the generator motor and supplies hydraulic oil to a cargo handling circuit. Electricity generated by the generator motor is stored in a battery and drives a steering electric motor. A steering hydraulic pump is actuated in conjunction with an operation of the steering electric motor and supplies hydraulic oil to a steering circuit. A bypass passage connects the cargo handling circuit and the steering circuit to each other, and supplies the hydraulic oil of the cargo handling circuit to the steering circuit. A switching valve is located in the bypass passage.

8 Claims, 2 Drawing Sheets

HYDRAULIC SYSTEM FOR INDUSTRIAL VEHICLE

CROSS REFERENCE TO RELATED APPLICATION

This application is based upon and claims the benefit of priority from prior Japanese Patent Application No. 2006-215846, filed on Aug. 8, 2006, the entire contents of which is incorporated herein by reference.

BACKGROUND OF THE INVENTION

The present invention relates to a hydraulic system used in a hybrid-type cargo handling industrial vehicle.

In recent years, hybrid type cargo handling industrial vehicles have been developed. The hybrid type industrial vehicle has a power source such as a gasoline engine and another power source constituted by a battery and a motor. For example, Japanese Laid-Open Patent Publication No. 2005-298163 discloses an industrial vehicle having a generator motor that is driven by an engine and generates electricity, and a cargo handling hydraulic pump that operates in conjunction with the generator motor. In this configuration, the generator motor is driven by the engine and generates electricity. The generated electricity is stored in a battery, and the stored electricity is used for driving a drive motor. Also, the generator motor may be used as a cargo handling motor by using the electricity of the battery. That is, the generator motor is used for actuating a cargo handling pump to generate hydraulic pressure for handling cargos. Further, since the generator motor and the cargo handling hydraulic pump operate in conjunction with each other, hydraulic pressure needed for handling cargos can be generated by driving the engine to drive the generator motor.

On the other hand, Japanese Laid-Open Patent Publication No. 7-315792 discloses a hydraulic circuit for an industrial vehicle equipped with a power steering apparatus to improve the steering operability when the vehicle is moving. The hydraulic circuit has a bypass passage that supplies hydraulic oil supplied to a steering circuit by a steering hydraulic pump to a cargo handling circuit. When the load of a cargo handling operation is small, the cargo handling hydraulic pump, which has a large capacity and receives large load, is stopped, and hydraulic pressure generated by a steering hydraulic pump, which has a small capacity is used for cargo handling. This configuration reduces the energy consumption by the power source.

In a hybrid type industrial vehicle in accordance with Japanese Laid-Open Patent Publication No. 2005-298163, the cargo handling hydraulic pump is actuated when the generator motor operates. Thus, when the generator motor is driven by the engine, the cargo handling hydraulic pump is operated in conjunction with the operation of the generator motor, so that hydraulic pressure for handling cargos is generated even if no cargo handling operation is performed. That is, the energy of the engine is redundantly consumed for driving the generator motor, which degrades the energy efficiency for driving the industrial vehicle.

A hybrid type industrial vehicle with a power steering apparatus has a steering hydraulic pump in addition to a cargo handling hydraulic pump. When the steering hydraulic pump is operated, hydraulic oil is supplied to the steering circuit, which is independent from the loading circuit. Therefore, the energy consumption may be suppressed by applying, to a hybrid type Industrial vehicle, the hydraulic circuit disclosed in Japanese Laid-Open Patent Publication No. 7-315792, that is, a hydraulic circuit that uses hydraulic pressure generated by a steering hydraulic pump to perform cargo handling.

However, the hydraulic circuit disclosed in Japanese Laid-Open Patent Publication No. 7-315792 is designed for supplying hydraulic pressure generated by a hydraulic pump to a cargo handling circuit. Thus, it is impossible to cancel the reduction in the energy efficiency caused by a configuration unique to the hybrid type, that is, by a configuration in which the cargo handling pump is actuated in conjunction with the generator motor.

SUMMARY OF THE INVENTION

Accordingly, it is an objective of the present invention to provide a hydraulic system that is used in a hybrid type industrial vehicle having a power steering apparatus, and efficiently uses hydraulic pressure generated by a cargo handling hydraulic pump when a generator motor generates electricity, thereby suppressing the amount of energy consumed by the operation of the industrial vehicle.

To achieve the foregoing objective, and in accordance with one aspect of the present invention, a hydraulic system of a hybrid type industrial vehicle drivable by an engine and an electric motor is provided. The hydraulic system includes a cargo handing circuit, a steering circuit, a generator, a cargo handling hydraulic pump, a battery, a steering electric motor, a bypass passage, and a switching valve. Hydraulic oil used in a cargo handling operation of the industrial vehicle flows through he cargo handling circuit. Hydraulic oil used in a steering operation of the industrial vehicle flows through the steering circuit. The generator motor is driven by the engine to generate electricity. The cargo handling hydraulic pump is actuated in conjunction with an operation of the generator motor and supplies hydraulic oil to the cargo handling circuit. The battery stores electricity generated by the generator motor. The steering electric motor is driven by electricity supplied from the battery. The steering hydraulic pump is actuated in conjunction with an operation of the steering electric motor and supplies hydraulic oil to the steering circuit. The bypass passage connects the cargo handling circuit and the steering circuit to each other. The hydraulic oil of the cargo handling circuit is supplied to the steering circuit through the bypass passage. The switching valve is located in the bypass passage.

DETAILED DESCRIPTION OF ILLUSTRATIVE EMBODIMENTS

Hereinafter, one embodiment of the present invention for carrying out the present invention will now be described with reference to the drawings.

Figure 1:
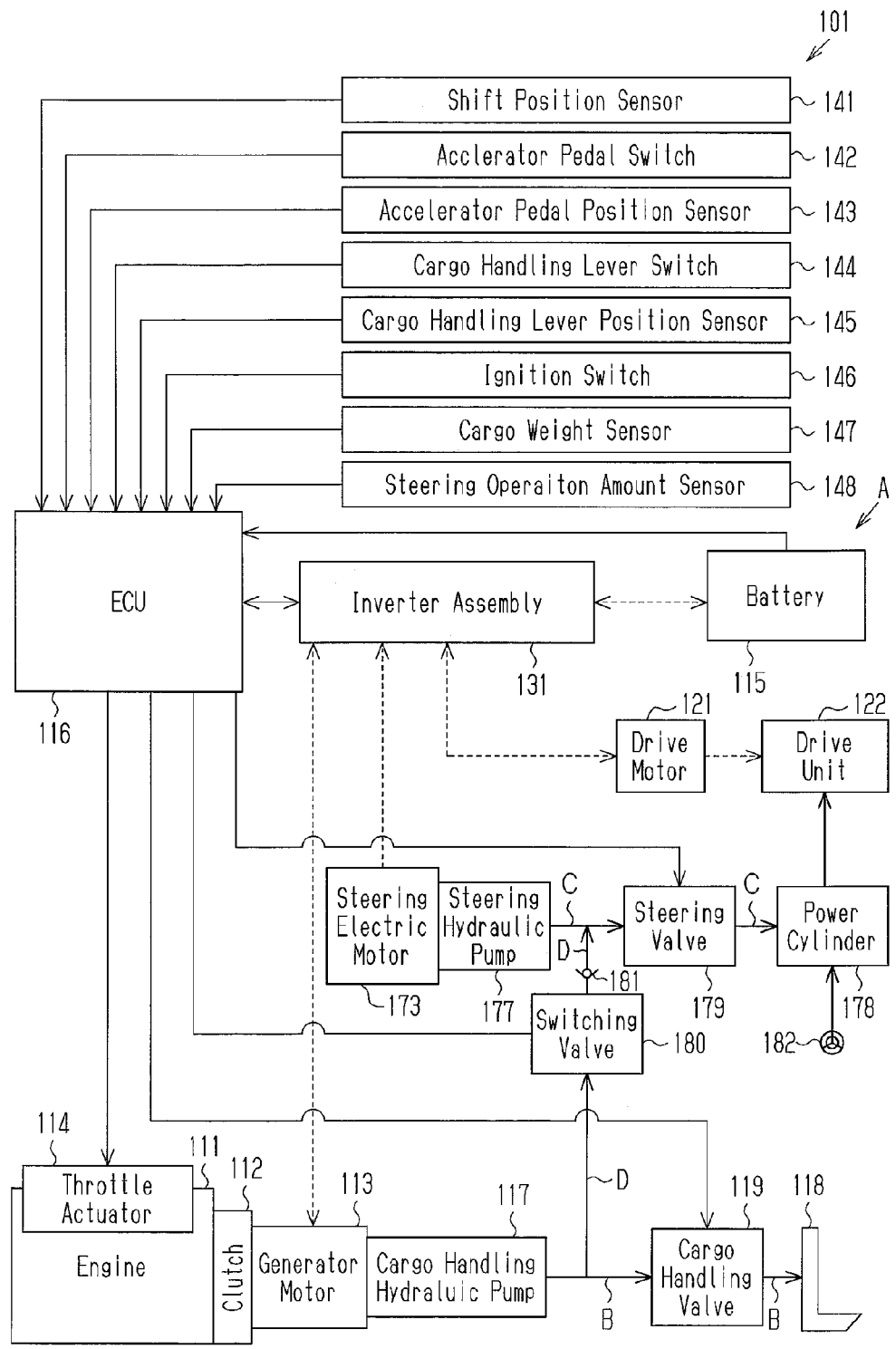
FIG. 1 is a block diagram illustrating a hydraulic system according to one embodiment of the present invention.

A hydraulic system A for a forklift 101 shown in FIG. 1 includes an engine 111, a generator motor 113, a battery 115, a cargo handling hydraulic pump 117, a cargo handling valve 119, a fork 118, a drive motor 121, a drive unit 122, an inverter assembly 131, an ECU 116, a steering electric motor 173, a steering hydraulic pump 177, a power cylinder 178, and a steering valve 179.

The engine 111 has a throttle actuator 114. The actuator 114 receives a rotation control signal from the ECU 116, which will be described below. The actuator 114 is driven based on the rotation control signal, and the engine 111 is driven in accordance with the driving of the actuator 114. The drive shaft (not shown) of the engine 111 is coaxially connected to the drive shaft (not shown) of the generator motor 113 with a clutch 112 in between. The clutch 112 selectively permits and shuts off the transmission of power from the engine 111 to the generator motor 113.

The generator motor 113 is switched between a generator and an electric motor mode as needed. In the generator mode, the generator motor 113 is driven by the engine 111 and generates electricity. The generated electricity is stored in the battery 115. In the electric motor mode, the generator motor 113 receives electricity from the battery 115 and is driven by the electricity. Control for switching modes is performed based on a control signal of the ECU 116 via the inverter assembly 131.

The forklift 101 has various types of sensors including a shift position sensor 141, an accelerator pedal switch 142, an accelerator pedal position sensor 143, a cargo handling lever switch 144, a cargo handling lever position sensor (cargo handling load detector) 145, an ignition switch 146, a cargo weight sensor 147, which are electrically connected to the ECU 116.

When the generator motor 113 is in the generator mode, the engine 111 functions as a driving source for the generator motor 113 and the cargo handling hydraulic pump 117, which are coaxially arranged with the engine 111. On the other hand, when the generator motor 113 is in the electric motor mode, the engine 111 and the generator motor 113 function as a driving source for the cargo handling hydraulic pump 117. However, in the electric motor mode, the clutch 112 may be disengaged, and only the generator motor 113, not the engine 111, may be used as the driving source for the cargo handling hydraulic pump 117. The clutch 112 is controlled based on a control signal of the ECU 116.

The battery 115 stores electricity generated by the generator motor 113 in the generator mode, and supplies electricity as needed for the driving and cargo handling operations of the forklift 101. The ECU 116 stores electricity in and discharges electricity from the battery 115 through the inverter assembly 131.

The ECU 116 is used for executing control of the entire system of the forklift 101, and the control includes control of storage and discharge of the battery 115. The ECU 116 receives the following information when necessary:

Shift position information from the shift position sensor 141
ON/OFF information from the accelerator pedal switch 142
Accelerator pedal depression amount information from the accelerator pedal position sensor 143
ON/OFF information from the cargo handling lever switch 144
Cargo handling lever position information from the cargo handling lever position sensor
ON/OFF information from the ignition switch 146
Cargo weight information from the cargo weight sensor 147
Steering operation information of a manipulation member (steering wheel) 182 from a steering operation amount sensor 148
Engine speed information of the engine 111 from an engine speed sensor (not shown)
Temperature information of the engine 111
Voltage and temperature information of the battery 115
Generator motor speed information of the generator motor 113 from a generator motor speed sensor (not shown)
Power output information and temperature information of the generator motor 113.

Based on the inputted information, the ECU 116 sends an engine control signal to the throttle actuator 114, and sends various types of control signals to the inverter assembly 131, thereby executing the system control of the forklift 101. The control signals received by the inverter assembly 131 include a mode switching signal for the generator motor 113, a storage control signal for the battery 115, a control signal for the drive motor 121, and a control signal for the steering electric motor 173.

When driving the forklift 101, the ECU 116 supplies the electricity of the battery 115 to the drive motor 121 through the inverter assembly 131. When the drive motor 121 is actuated, the drive unit 122, to which the drive motor 121 is coupled, performs driving operation.

Steering of the forklift 101 is executed by manipulating the manipulation member 182, such as a steering wheel. At this time, the amount of hydraulic oil supplied to the power cylinder 178 is determined based on the amount of manipulation (rotation amount and rotation speed of the steering wheel) of the manipulation member 182 detected by the steering operation amount sensor 148. In accordance with the determination, the steering valve 179 is switched and the required amount of hydraulic oil is supplied to the power cylinder 178 through a steering circuit C and the steering valve 179. Accordingly, the power cylinder 178 is actuated to execute the power steering operation, which reduces the force required for manipulating the manipulation member 182.

The cargo handling operation of the forklift 101 is executed by means of the cargo handling hydraulic pump 117, the fork 118 serving as a cargo handling device, and the cargo handling valve 119 used for supplying hydraulic oil from the cargo handling hydraulic pump 117 to the fork 118 as needed. The cargo handling valve 119 is provided in a cargo handling circuit B for supplying hydraulic oil from the cargo handling hydraulic pump 117 to the fork 118 (specifically, to an actuator such as a hydraulic cylinder for moving the fork 118). Further, a bypass passage D is connected to a section of the cargo handling circuit B between the cargo handling hydraulic pump 117 and the cargo handling valve 119. The bypass passage D conducts hydraulic oil to the steering circuit C. A switching valve 180, which is, for example, an electromagnetic valve, is located in the bypass passage D. The switching valve 180 is capable of selectively allows and blocks the flow of hydraulic oil from the cargo handling circuit B to the steering circuit C. A check valve 181 is provided in the bypass passage D to block the flow of hydraulic oil from the steering circuit C to the cargo handling circuit B. Accordingly, the hydraulic oil is prevented from flowing from the steering circuit C to the cargo handling circuit B through the bypass passage D, so that the hydraulic pressure of the steering circuit C is maintained.

An operation of the present embodiment will now be described.

When the clutch 112 is engaged, the engine 111 functions as the driving source for both of the generator motor 113 and the cargo handling hydraulic pump 117.

When electricity needs to be supplied the battery 115, the generator motor 113 is controlled to be in a state to function as a generator (hereinafter, the state is referred to as a first mode). When the battery 115 stores a sufficient amount of electricity, the generator motor 113 is controlled to be in a state to function as an electric motor (hereinafter, the state is referred to as a second mode).

In the first mode, the power of the engine 111 is transmitted to the generator motor 113 through the clutch 112, and electricity generated by the generator motor 113 is successively stored in the battery 115. The cargo handling hydraulic pump 117 is constantly actuated by the rotation of the drive shaft of the engine 111, and sends hydraulic oil to the cargo handling circuit B.

When the cargo handling load is small in the first mode, the ECU 116 controls the generator motor 113 in such a manner as to increase the amount of electricity generated by the generator motor 113 and the amount of charge of the battery 115. In this case, the ECU 116 controls the generator motor 113 such that the load applied to the engine 111 by the generator motor 113 has a suitable value for operating the engine 111 under predetermined optimum conditions. The optimum conditions include an engine speed and a fuel injection amount that allow the engine 111 to operate at the optimum fuel economy, and are determined, for example, through experiments. Even with a small cargo handling load, if the battery 115 is almost fully charged, the ECU 116 controls the generator motor 113 not to generate electricity in some cases.

In the second mode, the cargo handling hydraulic pump 117 is driven by both of the engine 111 and the generator motor 113. The actuation of the cargo handling hydraulic pump 117 by the engine 111 is assisted by the generator motor 113. Thus, even if the engine 111 is a low power type, a cargo handling requiring a high power can be performed.

Figure 2:
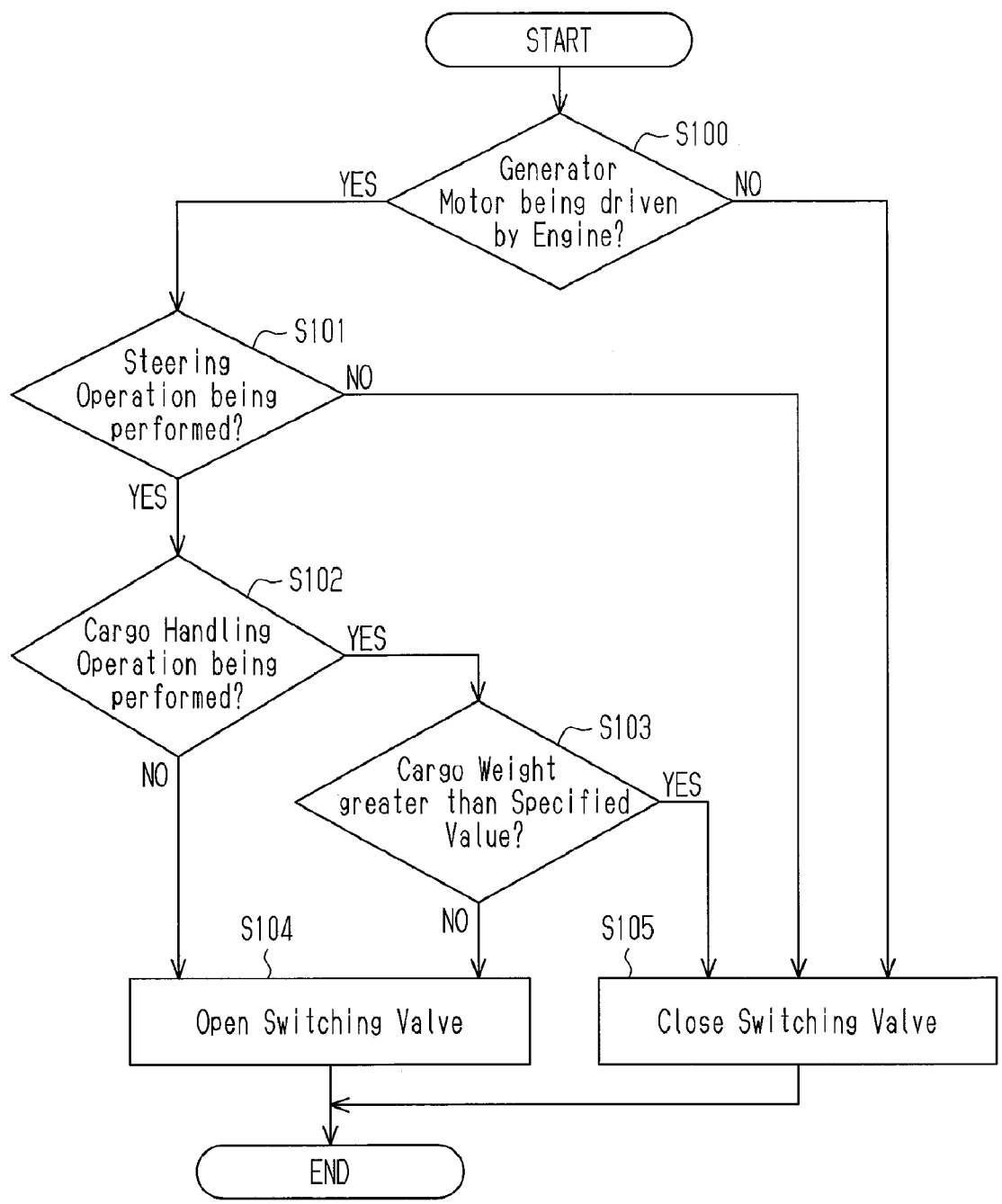
FIG. 2 is a flowchart showing control of the switching valve shown in FIG. 1.

The control of the switching valve 180 will now be described with reference to the flowchart shown in FIG. 2.

First, in step S100, the ECU 116 determines whether the generator motor 113 is being driven by the engine 111. If the engine 111 is not running or if the clutch 112 is disengaged, the generator motor 113 is not being driven by the engine 111. In such a case, the ECU 116 proceeds to step S105, and control the switching valve 180 to be closed. This blocks the bypass passage D. In contrast, when the clutch 112 is engaged and the engine 111 is running, the engine 111 is driving the generator motor 113. In such a case, the ECU 116 proceeds to step S101. The state in which the engine 111 is driving the generator motor 113 corresponds to a state in which the generator motor 113 is in the first mode or the second mode.

In step S101, the ECU 116 determines whether a steering operation is being performed. If the steering operation is not being performed, the ECU 116 proceeds to step S105, and controls the switching valve 180 to be closed. In contrast, if the steering operation is being performed, the ECU 116 proceeds to step S102, and determines whether a cargo handling operation is being performed.

If the cargo handling operation is not being performed, the ECU 116 proceeds to step S104, and controls the switching valve 180 to be open, so that the bypass passage D is open. Accordingly, the hydraulic oil in the cargo handling circuit B is conducted to the steering circuit C, and is used for actuating the power cylinder 178.

At this time, if the flow rate of the hydraulic oil flowing into the steering circuit C through the bypass passage D is less than the flow rate required for the steering operation, or if the pressure of the hydraulic oil is less than the pressure required for the steering operation, the steering electric motor 173 is actuated to compensate for the shortage of the flow rate or pressure of the hydraulic oil. For example, based on measurement results by a hydraulic gauge (not shown) located in the steering circuit C, the ECU 116 outputs a control signal for the steering electric motor 173 to the inverter assembly 131, thereby controlling the actuation of the steering hydraulic pump 177.

If the flow rate and pressure of the hydraulic oil flowing into the steering circuit C through the bypass passage D are more than the values required for the steering operation, the steering electric motor 173 is stopped, and the power cylinder 178 is actuated only by the hydraulic oil conducted to the steering circuit C through the bypass passage D. Accordingly, the number of times of the actuation of the steering electric motor 173 is reduced. This decreases the electricity consumed by the steering electric motor 173. Also, deterioration of the steering electric motor 173 and the steering pump 177 is suppressed.

In the above, the steering electric motor 173 and the steering pump 177 are controlled according to the measured values of the flow rate and the pressure of the hydraulic oil flowing into the steering circuit C through the bypass passage D. However, the steering electric motor 173 and the steering pump 177 may be controlled in a different manner. For example, in a state where a steering operation is performed during the actuation of the generator motor 113 by the engine 111, the steering electric motor 173 may be stopped when the switching valve 180 has been switched to the open state. In this case, a predetermined load (specified value) as a threshold value is set. The specified value is used for determining whether to open the switching valve 180 in step S103, which will be discussed below. By setting the threshold value at a value that allows hydraulic oil having flow rate and pressure required for the steering operation to be supplied from the cargo handling circuit B to the steering circuit C through the bypass passage D, the steering operation is prevented from being unstable. The hydraulic system of this configuration is advantageously simplified since no flow rate gauge or pressure gauge is required.

If the decision outcome of step S102 is positive, that is, when the steering operation and the cargo handling operation are both being performed, the ECU 116 proceeds to step S103 and determines whether the cargo handling load inputted from the cargo weight sensor 147 is greater than the specified value.

If the cargo handling load is greater than the specified value, the ECU 116 proceeds to step S105, and controls the switching valve 180 to be closed. That is, to ensure that the supply flow rate and the pressure of hydraulic oil are sufficient for the cargo handling operation, the switching valve 180 is controlled such that hydraulic oil is preferentially supplied to the fork 118 from the cargo handling hydraulic pump 117. This prevents the pressure of the hydraulic oil in the cargo handling circuit B from being lowered, and thus stabilizes the cargo handling operation. At this time, the steering electric motor 173 is controlled to be in a driven state, and hydraulic oil is supplied from the steering hydraulic pump 177 to the steering circuit C. The supplied hydraulic oil actuates the power cylinder 178.

In contrast, if the cargo handling load is equal to or less than the specified value, the ECU 116 proceeds to step S104, and controls the switching valve 180 to be open. That is, when the supply flow rate and the hydraulic pressure of the hydraulic oil supplied to the fork 118 are sufficient for the cargo handling operation, the switching valve 180 is controlled such that the cargo handling operation is performed by supplying hydraulic oil to the cargo handling circuit B, while also supplying hydraulic oil to the steering circuit C through the bypass passage D. Accordingly, the hydraulic pressure generated in the cargo handling circuit B is guided to the steering circuit C, and is used for the steering operation.

At this time, as in the case where no cargo handling operation is being performed, if the flow rate and pressure of the hydraulic oil flowing into the steering circuit C through the bypass passage are sufficient for actuating the power cylinder 178, the steering electric motor 173 is controlled to be in the stopped state. In contrast, when the flow rate and the pressure of the hydraulic oil are insufficient, the steering electric motor 173 is controlled to be in the driven state to compensate for the shortage of the flow rate and the pressure of the hydraulic oil. As in the case where no cargo handling operation is being performed, the configuration of the hydraulic system may be simplified by applying a simple process in which the steering electric motor 173 is stopped when the switching valve 180 is open.

Step S103 may be omitted, and the switching valve 180 may be controlled based on the determination whether the cargo handling operation is being performed That is, in the case where the steering operation is performed during the operation of the generator motor 113, if it is determined that the cargo handling operation is not being performed in step S102, the switching valve 180 may be switched to the open state. In this case, if it is determined that the cargo handling operation is being performed in step S102, the switching valve 180 may be switched to the closed state. Specifically, it may be configured that the switching valve 180 is closed when the cargo handling lever switch 144 is ON, and the switching valve 180 is open when the cargo handling lever switch 144 is OFF. In this case, the cargo weight sensor 147 becomes unnecessary. Thus, the hydraulic system is simplified.

Hereinafter, discussion will now be made on the operation of the present embodiment in a state where the clutch 112 is disengaged.

When there is only relatively low demand for the cargo handling operation, the ECU 116 determines that there is no demand for power the degree of which can be achieved by causing the engine 111 and the generator motor 113 functioning as an electric motor to cooperate. In this case, the ECU 116 outputs a control signal to cause the generator motor 113 to operate as an electric motor, and causes the clutch 112 to be disengaged. Hereinafter, the state is referred to as a third mode. In this case, although the generator motor 113 drives the cargo handling hydraulic pump 117, the engine 111 does not contribute to the operation of the cargo handling hydraulic pump 117.

In the third mode, the engine 111 idles or is stopped, so that the energy efficiency at the actuation of the cargo handling hydraulic pump 117 is improved. Also, since the clutch 112 is disengaged, no great load (compression braking) is applied to the generator motor 113 when the generator motor 113 operates.

In the third mode, the generator motor 113 is not driven by the engine 111. Thus, the decision outcome in step S100 of FIG. 2 is negative, and the ECU 116 proceeds to step S105 to control the switching valve 180 to be closed.

Therefore, when performing a cargo handling operation, the generator motor 113 is driven as an electric motor by the electricity of the battery 115. In conjunction with the operation of the generator motor 113, the cargo handling hydraulic pump 117 is actuated to supply hydraulic oil to the cargo handling circuit B.

When performing a steering operation, the steering electric motor 173 is driven by the electricity of the battery 115. In conjunction with the operation of the steering electric motor 173, the steering hydraulic pump 177 is actuated to supply hydraulic oil to the steering circuit C.

According to the configuration of the present embodiment, when the generator motor 113 is driven by the engine 111, the hydraulic oil supplied to the cargo handling circuit B can be guided to the steering circuit C and used as hydraulic oil for steering that exerts the power steering performance. In the case where the operation of the engine 111 supplies a sufficient amount of hydraulic oil from the cargo handling hydraulic pump 117 to the cargo handling circuit B, the steering hydraulic pump 177 does not need to be actuated. The steering electric motor 173 for actuating the steering hydraulic pump 177 is therefore used less frequently. Therefore, the amount of electricity consumed by the steering electric motor 173 is reduced. As a result, the energy consumption required for driving the forklift 101 is reduced.

When the cargo handling load is greater than a predetermined load, the hydraulic oil in the cargo handling circuit B does not flow to the steering circuit C. Therefore, as long as the cargo handling hydraulic pump 117 supplies the hydraulic oil the amount of which is required for the cargo handling operation to the cargo handling circuit B, the hydraulic pressure will not be insufficient. This ensures that the cargo handling operation is stably performed.

The invention is not to be limited to the details given herein, but may be modified within the scope and equivalence of the appended claims.

(1) In the illustrated embodiment, a clutch is provided between the engine and the generator motor. However, the present invention may be applied to a clutchless industrial vehicle in which a generator motor is always driven when the engine is running. In this case, it is only necessary to control the hydraulic circuit in the same manner as the control of the switching valve 180 when the clutch 112 is engaged.

(2) The illustrated embodiment may be applied not only to forklifts, but also to industrial vehicles used for agriculture, construction, and transportation that require the operation of cargo handling attachments.

What is claimed:

1. A hydraulic system of a hybrid type industrial vehicle drivable by an engine and an electric motor, comprising:
   a cargo handling circuit through which hydraulic oil used in a cargo handling operation of the industrial vehicle flows;
   a steering circuit through which hydraulic oil used in a steering operation of the industrial vehicle flows;
   a generator motor driven by the engine to generate electricity;
   a cargo handling hydraulic pump that is actuated in conjunction with an operation of the generator motor and supplies hydraulic oil to the cargo handling circuit;
   a battery storing electricity generated by the generator motor;
   a steering electric motor driven by electricity supplied from the battery;
   a steering hydraulic pump that is actuated in conjunction with an operation of the steering electric motor and supplies hydraulic oil to the steering circuit;
   a bypass passage connecting the cargo handling circuit and the steering circuit to each other, wherein the hydraulic oil of the cargo handling circuit is supplied to the steering circuit through the bypass passage; and
   a switching valve located in the bypass passage.

2. The hydraulic system according to claim 1, wherein, in a state where the steering operation is performed while the engine is driving the generator motor, the switching valve:
   permitting, if a cargo handling load in the cargo handling operation is equal to or less than a specified value, the hydraulic oil to flow from the cargo handling circuit to the steering circuit through the bypass passage; and blocking, if the cargo handling load is greater than the specified value, the flow of the hydraulic oil from the cargo handling circuit to the steering circuit through the bypass passage.

3. The hydraulic system according to claim 2, wherein, in a state where the steering operation is performed while the engine is driving the generator motor, the steering electric motor is stopped if the switching valve permits the hydraulic oil to flow from the cargo handling circuit to the steering circuit through the bypass passage.

4. The hydraulic system according to claim 2, wherein, if a flow rate or a pressure of the hydraulic oil flowing into the steering circuit through the bypass passage is less than a value required for the steering operation, the steering electric motor is driven to compensate for the shortage of the flow rate or the pressure.

5. The hydraulic system according to claim 1, wherein, in a state where the steering operation is performed while the engine is driving the generator motor, the switching valve:
   permitting, when the cargo handling operation is not performed, the hydraulic oil to flow from the cargo handling circuit to the steering circuit through the bypass passage; and
   blocking, when the cargo handling operation is performed, the flow of the hydraulic oil from the cargo handling circuit to the steering circuit through the bypass passage.

6. The hydraulic system according to claim 4, wherein, in a state where the steering operation is performed while the engine is driving the generator motor, the steering electric motor is stopped if the switching valve permits the hydraulic oil to flow from the cargo handling circuit to the steering circuit through the bypass passage.

7. The hydraulic system according to claim 5, wherein, if a flow rate or a pressure of the hydraulic oil flowing into the steering circuit through the bypass passage is less than a value required for the steering operation, the steering electric motor is driven to compensate for the shortage of the flow rate or the pressure.

8. The hydraulic system according to claim 1, further comprising a check valve located in the bypass passage, the check valve blocking a flow of the hydraulic oil from the steering circuit to the cargo handling circuit.

* * * * *